United States Patent [19]
Padovano et al.

[11] Patent Number: 5,306,064
[45] Date of Patent: Apr. 26, 1994

[54] VEHICLE FREIGHT CLAMPING ASSEMBLY

[76] Inventors: Nina Padovano; Daniel Morski, both of 5960 Jamieson Ave., Encino, Calif. 91316

[21] Appl. No.: 59,125
[22] Filed: May 10, 1993
[51] Int. Cl.⁵ .......................................... B62D 33/08
[52] U.S. Cl. ..................................... 296/24.1; 24/486; 248/228; 108/153; 403/387
[58] Field of Search ..................... 296/24.1; 24/486; 403/387; 248/228; 108/153

[56] References Cited

U.S. PATENT DOCUMENTS

| | | | |
|---|---|---|---|
| 2,158,503 | 5/1939 | Hewel | 211/93 |
| 2,729,498 | 1/1956 | Law | 296/24.1 |
| 2,826,108 | 3/1958 | Mills | 81/177.85 |
| 3,000,666 | 9/1961 | Fernandes | 296/24.1 |
| 3,179,073 | 4/1965 | Gingher et al. | 108/153 |
| 3,589,768 | 6/1971 | Wilson | 296/24.1 |
| 3,792,894 | 2/1974 | Vande Water et al. | 296/24.1 |
| 4,236,747 | 12/1980 | Ratliff | 296/24.1 |
| 4,759,654 | 7/1988 | Martin et al. | 403/387 |

Primary Examiner—Robert R. Song
Attorney, Agent, or Firm—Richard C. Litman

[57] ABSTRACT

A storage or cargo system clamping assembly is utilized in a freight area of a motorized vehicle and semi-permanently attaches a storage system to the horizontal wooden slats found in the interior of a motorized vehicle. This storage system has vertically disposed struts for readily accepting a threaded screw-type member, which extends, non-restrictively, through the strut member whether a shelf leg or an iron frame and engages an L-shaped member having a threaded hole corresponding to the screw. Such a storage system and clamping assembly provides great versatility to freight and cargo vehicles, allowing for easy installation, adjustment, or removal of the storage system, without damaging the vehicle or leaving any telltale markings on the vehicle that would indicate that a storage system was utilized within the vehicle.

6 Claims, 3 Drawing Sheets

VEHICLE FREIGHT CLAMPING ASSEMBLY

BACKGROUND OF THE INVENTION

1. FIELD OF THE INVENTION

The present invention relates generally to accessories for transport vehicles, and more particularly, to a clamping assembly for attaching shelving, inventory systems, and other structurally related storage systems, such as closets, cabinets, dressers, desks, drawers, darkrooms, worktables, and wardrobes to internal wall support members that are conventional, integral parts of the walls of most medium to large cargo vehicles. The clamping assembly provides firm mounting of the shelving and other storage systems and ready detachment thereof, without in any way marring or disfiguring the wall support members of cargo vehicles within which the systems are temporarily installed.

2. DESCRIPTION OF THE RELATED ART

The instant invention provides for the firm attachment of a storage system within a cargo vehicle, such as a moving van, or work truck for a production company, without need for drilling holes, cutting through walls or wall members, or in any way marring or damaging the vehicle cargo carrying interior. Thus, use of this invention is particularly advantageous when leasing a moving van or the like for a period of time, to convey freight (e.g., movie sets and related gear) back and forth from place to place, or operate as a production vehicle, and then relinquish the vehicle at the end of the lease without having damaged the cargo carrying interior at all; the shelving, storage, and associated clamping assemblies of this invention are as easily removed as they are installed. In short, the invention has universal application, in the film, television, and commercial industries as well as for general freight hauling in the industrial and moving company markets.

The known prior art teaches somewhat related shelving assemblies, or clamping structures, or both, as follows.

U.S. Pat. No. 2,158,503, issued May 16, 1939 to Frank B. Hewel, discloses a shelving system for delivery vehicles that allows easy and quick access to a plurality of shelves while minimizing the amount of sliding, adjusting, or removing of the shelves required to accomplish such an action. The shelving system utilized here comprises a plurality of flat planar surfaces, hingedly attached to one another, and to the interior walls of the vehicle, extend inwardly towards the center of the vehicle, whereby, after the center shelves are moved from a non-supporting vertical disposition to their useful, shelf-like horizontal position, a small number of vertically disposed planar members are introduced thereto, so as to keep the products in the vehicle from moving about during transport. Although the Hewel structure is somewhat similar, with respect to the utilization of horizontal members of the vehicle cargo walls to support the shelving units within the vehicle, the structural differences and manner in which the shelving is connected to the interior of the vehicle are vastly different; the system of Hewel requires permanent alteration to the interior of the vehicle, which is avoided with the utilization of the present invention. Use of the Hewel system in a leased vehicle would not be economically feasible or even possible.

U.S Pat. No. 2,826,108, issued Mar. 11, 1958 to Edward L. Mills, teaches a lipped, washer type nut fastener assembly, remotely similar to the L-shaped member of the present invention in regards to physical construction, but not having any utility in the environment of the instant invention. Furthermore, the multi-part fastener assembly of Mills cannot be utilized in and of itself as a means of fastening a threaded member to a supporting surface without the aid of a threaded nut.

U.S. Pat. No. 3,175,073, issued to Carl E. Gingher et al. on Apr. 20, 1969, discloses a modular shelving unit of an adjustable nature, having vertically disposed support members with holes drilled therein to accept the adjusters of the shelving platforms that are incorporated within the unit. Although these vertical members are remotely similar in structure to those utilized in the present invention, no means of attaching such a unit to the walls of a vehicle using these members, or any other member of the unit, is taught.

U.S. Pat. No. 4,236,747, issued to Roger D. Ratliff on Dec. 2, 1980, discloses a transport vehicle having a variety of features making it a versatile transport vehicle. Although a removable shelving unit is an essential feature of one of the three cargo areas disclosed, no manner of attaching the shelving in a temporary, semi-permanent, or permanent fashion is disclosed.

Lastly, U.S. Pat. No. 4,759,654, issued to Graham L. Martin et al. on Jul. 26, 1988, discloses a three part clamping device for holding a grid-like member to a rigid I-beam or the like, rather than an uncomplicated, two part clamping assembly as herein disclosed and claimed. The clamping device of Martin et al. includes an L-shaped clamping member with a plurality of geometrical cutouts for non-rotational contact between the clamping member and the rigid structure. Features on the heads at the ends of the lever-arm portions of the L-shaped members help to secure the grid-like member to the I-beam through centralized pressure on the shaped portions of the member. Also seen on this L-shaped member is a tapered, threaded hole used to accept a threaded bolt or the like to secure the clamp. Although this arrangement appears somewhat similar to the present invention, the threaded hole therein is placed in the center of the long side of the L-shaped member between the shaped end of the member and the right angle of bend of the member itself, whereas the present invention utilizes a cantilever-type grip to secure the shelving unit to the wall member. The present invention is further distinguished in that the threaded hole is located in a substantially different location of the member, that is, adjacent to the right angle bend of the member.

None of the above inventions and patents, taken either singly or in combination, is seen to describe the present invention as claimed.

SUMMARY OF THE INVENTION

Accordingly, it is a principal object of the invention to provide a storage system that is readily, removably attached to the interior of a motorized transport vehicle of the type with ribbed interior walls, having reinforcing members, ordinarily wooden slats, horizontally attached to the ribbing in such a manner as to allow for a space between the surface of the wall and the reinforcing so as to accept a clamping assembly that secures the storage system to the vehicle, without need of modifying the cargo interior in any fashion whatsoever.

It is another object of the invention to provide a storage system that, after being installed in and then removed from the vehicle, leaves no damage to or marring of the vehicle interior because of the temporary installation of the storage system.

It is a further object of the invention to secure a storage system within the vehicle by an L-shaped clamping member and screw that, together, utilized along with vertical strut members of a storage system, securely clamp the storage system to the reinforcing slat member on the interior of the vehicle.

Still another object of the invention is to provide a readily mounted and removed clamping assembly that is easy to use, as well as access from inside the vehicle, while still effectively securing a storage system in place.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
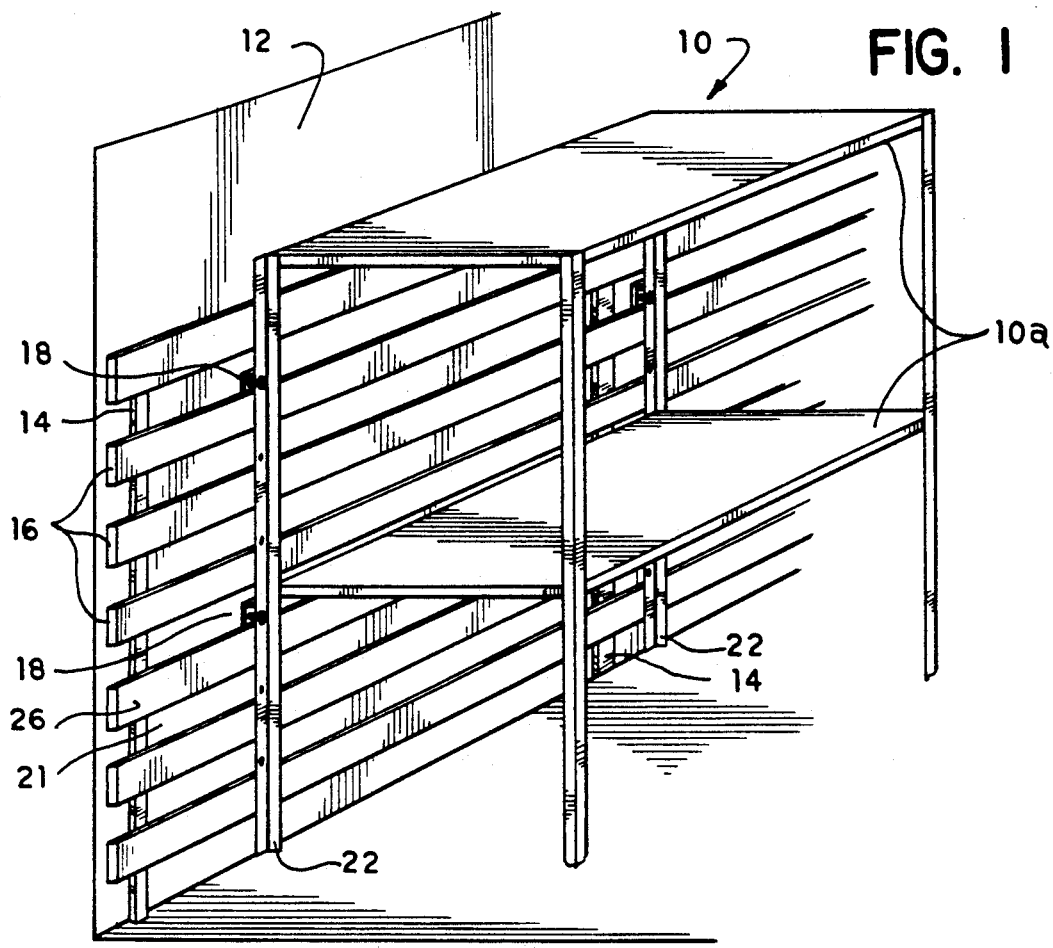
FIG. 1 is a partial perspective view of the clamping assembly, a shelving system, and the typical interior of a vehicle in which the unit is incorporated.

Referring now in detail to the drawings, FIG. 1 illustrates the shelving system 10 secured to a wall 12 of a transport vehicle, e.g., a moving van, having ribs 14 and horizontal reinforcing wooden slat members 16 to which the clamping assemblies, each made up of an L-shaped member 18 and a screw 20, physically secure a vertical strut 22 of the shelving system 10 to a van wall 10. It should be carefully noted here that, in this preferred embodiment, a high grade alloy socket head screw 20 is chosen, and the L-shaped bracket member 18 is also made of a high material. Materials are chosen for reasons of safety and weight capacity. In this, the preferred embodiment, a shelving system 10 has been chosen to represent the storage system. Any other storage or structural device such as a cabinet, desk, dresser, closet, wardrobe, or work table having vertical strut members 22 rigidly attached thereto or incorporated into the design thereof may also be attached to a similar vehicle interior by the same L-shaped member 18 and screw 20. Each threaded screw 20 is attached to an L-shaped member 18 through a matingly threaded opening 24, and the resultant assembly co-planarly clamps the vertical struts 22 of the shelving system 10 to the horizontal reinforcing slat members 16.

Figure 2:
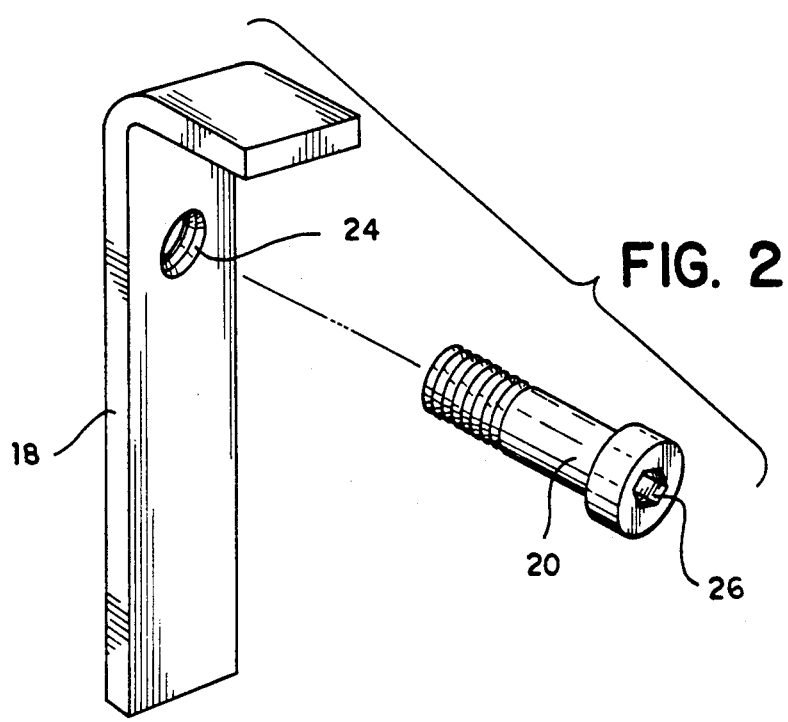
FIG. 2 is an enlarged scale, exploded perspective view of the clamping assembly, including the L-shaped member and a socket head screw.

The clamping assembly utilized by shelving system 10 is best illustrated in FIG. 2, which shows an L-shaped member 18 having threaded opening 24 and threaded screw 20. In addition, threaded screw 20 has a flared head with a recess 26 for accepting an Allen, Torx, or similar key for tightening and loosening screw 20 in clamp member 18.

Figure 3:
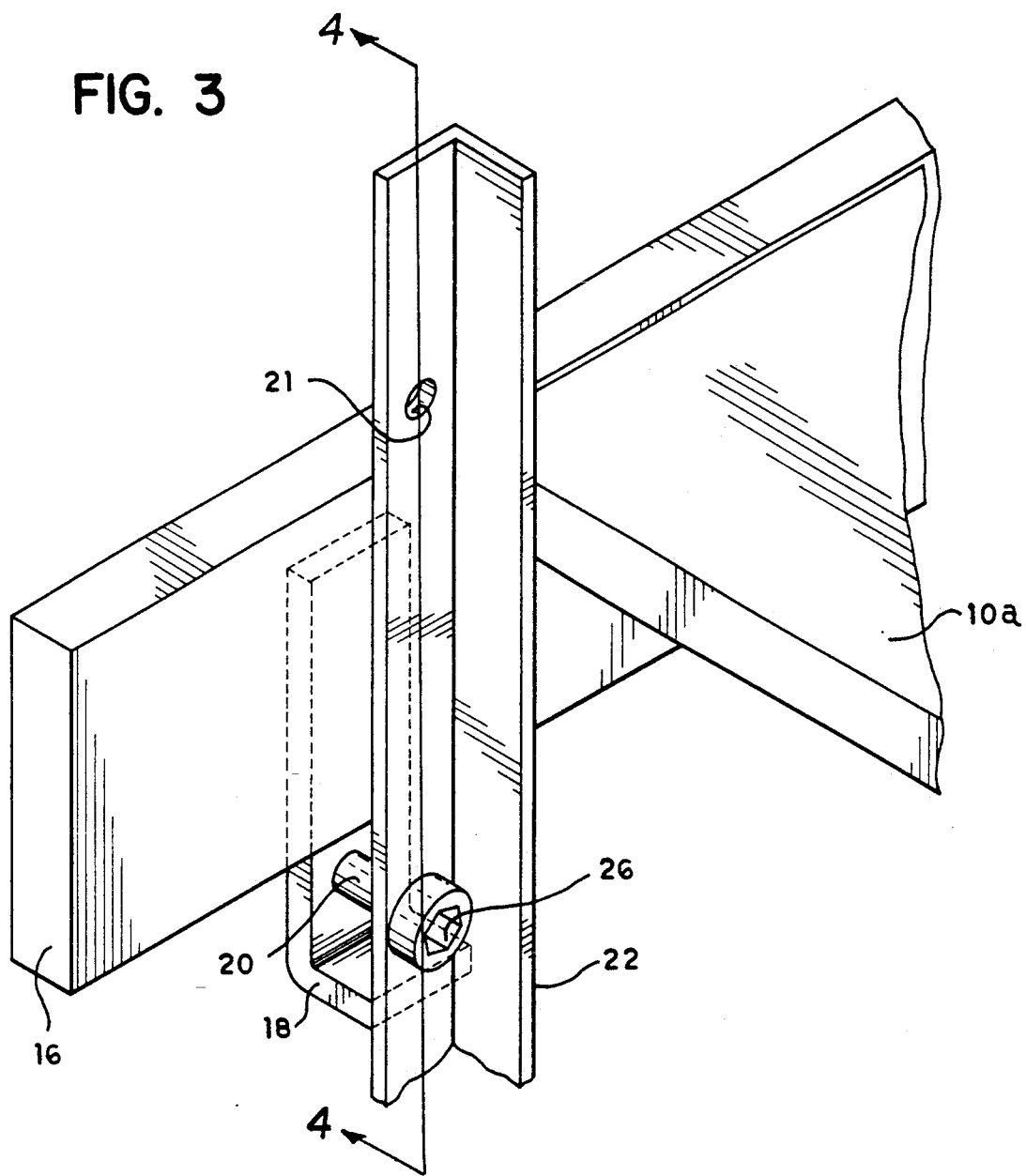
FIG. 3 is an enlarged scale, partial perspective view showing the clamping device, shelving unit, and vehicle interior, wherein the clamping device of FIG. 1 is shown in an inverted attitude.
Figure 4:
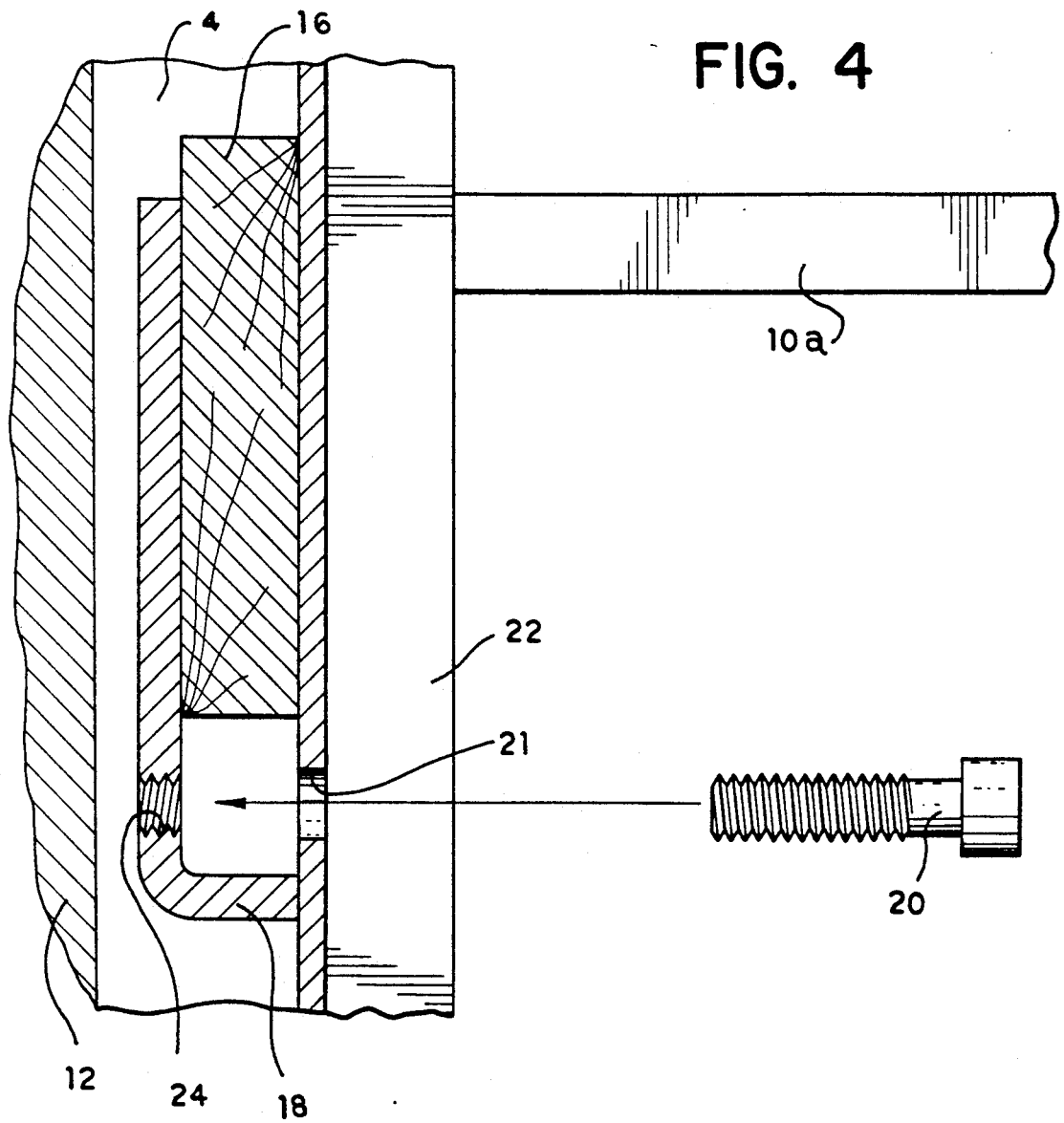
FIG. 4 is a sectional view taken along line 4—4 of FIG. 3, illustrating further details of clamping the shelving system within a vehicle interior.

FIG. 3 illustrates an additional configuration of L-shaped member 18, clamping onto a reinforcing slat member 16 of wall 12 (not shown) of the vehicle. Also seen are the components of the shelving system 10 including the vertical struts 22 and a planar surface 10a of a shelf. Referring back to FIGS. 1 and 2, it can be seen that the L-shaped members 18 are positioned in such a manner that a first leg extends downward from the second leg, around the reinforcing slat member 16. Conversely, in FIGS. 3 and 4 the L-shaped member 18 is disposed with the first leg of member 18 extending upwardly from the second leg, around or partially encompassing the reinforcing slat member 16.

The L-shaped member or clamp means 18 defines a lever and said second leg defines a fulcrum, thereby enabling screw 20 to exert a tensile force originating from the vertical support strut 22 and drawing said first leg against the reinforcing slat member 16, thus, clamping the vertical support strut 22 of the shelving system 10 to the horizontal slat 16.

When installing the shelving units into a transport vehicle, the shelving is placed along the interior walls 12 of the vehicle. Any number of shelves may be placed along the interior walls 12 of the vehicle since each individual section of shelving is attached to the reinforcing slat members 16 of the interior wall 12 individually. This allows for additional usage of the freight area of the vehicle, ranging from the utilization of just a single piece of shelving to an entire shelving system, to accommodate various sizes and types of cargo. As the shelving system 10 is placed within the freight area, the vertical struts 22 of system 10 are situated flush against the reinforcing slat members 16 of the freight area. An L-shaped member 18 is then moved into position, above or underneath the reinforcing slat member 16, and is aligned with a non-threaded circular opening on the vertical strut 22 so that screw 20 may be inserted through said strut 22. Screw 20 is received in matingly threaded opening 24 of L-shaped member 18, and tightened to tensionally pull and secure L-shaped member 18 against the reinforcing member 22 by use of a tool (not shown) that compliments recess 26 in the head of screw 20, to draw in the L-shaped member 18.

Removal of the system 10 from the interior of the vehicle is accomplished through a reversing of the steps used when placing shelving system 10 in the vehicle. Screws 20 are simply loosened so that members or brackets 18 can be removed. Thereafter, the shelving 10 is dismantled and/or taken from the vehicle cargo area in conventional fashion.

It should now be understood that such a shelving system 10 and clamping assembly utilizing an L-shaped member 18 and threaded screw member 20 to clamp shelving struts to reinforcing members 16 of a freight area wall, may be incorporated into any vehicle having planar surfaces, with members such as horizontal reinforcing slat members 16 spaced from a wall surface, and also spaced apart in such a manner that the reinforcing members may be accessed from the top, bottom, front, and rear surfaces. Furthermore, the reinforcing slat members 16 of the wall 12 need not be horizontally disposed within the vehicle to accept the clamping assembly. If there exists ample space in any type of vehicle, be it an automobile, plane, boat, etc., a storage system, utilizing the above mentioned clamping members, may be assembled therein for purposes of freight and cargo management.

It is to be understood that the present invention is not limited to the sole embodiment described above, but encompasses any and all embodiments within the scope of the following claims.

I claim:

1. For use within a motorized vehicle having an enclosed freight compartment, the compartment having horizontal reinforcing slat members spaced apart from the walls, there being a gap between the walls and the slats, a storage system including:

storage means having at least one vertical support strut with a vertical surface parallel to and clamped against a horizontal reinforcing slat member of the freight compartment;

means defining a plurality of spaced openings along said vertical surface of at least one strut; and clamp means comprising L-shaped members, each having a first leg and a second leg being disposed normal to one another, said first leg being placed in substantially parallel contact with said one of the slat members, and within the gap between the slat member and the wall, said second leg being supported substantially perpendicularly by said first leg against said at least one strut, thereby partially encompassing the reinforcing slat member between said strut and said each first leg of said clamp means, whereby said reinforcing slat member is unencumbered by a concentrated force bearing thereupon to effect clamping, each of said L-shaped members having:

means defining a threaded bore through an end of said each first leg adjacent said each second leg; and screw means, matingly engageable with and passing through said threaded bore; whereby said clamp means define a lever and said each second leg defines a fulcrum, thereby enabling said screw means to exert a tensile force originating from said at least one vertical support strut and drawing said each first leg against the reinforcing slat member, thus clamping said at least one vertical support strut to said reinforcing slat member.

2. The storage system according to claim 1, further comprising a plurality of support struts, each of said support struts being provided with at least a pair of said clamping means, said clamping means being disposed such that said first legs depend downwardly from said second legs, said second legs thus being positioned over and above top surfaces of reinforcing members of a vehicle freight compartment wall.

3. The storage system according to claim 1, further comprising a plurality of support struts, each of said support struts being provided with at least a pair of said clamping means, said clamping means being disposed such that said first legs extend upwardly from said second legs, said second legs thus being positioned beneath and across bottom surfaces of reinforcing members of a vehicle freight compartment wall.

4. Clamps for securing storage means utilizing at least one support strut having a vertical surface disposed against the interior wall of an enclosed freight compartment of a truck, the compartment having walls and horizontal slats serving as reinforcing members spaced apart from the walls, thereby defining a gap between the walls and the slats, each of said clamps comprising:

a clamp means comprising an L-shaped member having a first leg and a second leg being disposed normal to one another, said first leg being placed in substantially parallel contact with one of said horizontal slats and occupying the gap between one of said horizontal slats and one of said walls, said second leg being supported normally against the vertical surface of said support strut, and thereby partially surrounding said reinforcing member between said vertical surface of said support strut and said first leg of said clamp means, whereby the reinforcing member is unencumbered by a concentrated force bearing thereupon to effect clamping, said L-shaped member further comprising:

means defining a threaded bore through an end of said first leg adjacent said second leg; and screw means, matingly engageable with and passing through said threaded bore; whereby said clamp means define a lever, and said second leg defines a fulcrum, thereby enabling said screw means to exert a tensile force originating from said vertical surface of said at least one support strut and drawing said first leg against said reinforcing member, thus clamping said at least one support strut to said reinforcing member.

5. The clamps according to claim 4, further comprising at least a pair of said clamping means, said clamping means being disposed such that said first legs depend downwardly from said second legs, said second legs thus being positioned over and above top surfaces of said horizontal slats of a vehicle freight compartment wall.

6. The clamps according to claim 4, further comprising at least a pair of said clamping means, said clamping means being disposed such that said first legs extend upwardly from said second legs, said second legs thus being positioned beneath and across bottom surfaces of said horizontal slats of a vehicle freight compartment wall.

* * * * *